United States Patent [19]

Smith

[11] Patent Number: 4,689,826
[45] Date of Patent: Aug. 25, 1987

[54] OPTICAL COMMUNICATION OF VIDEO AND AUDIO WITH CROSS-TALK SUPPRESSION

[76] Inventor: Clyde Smith, 42 Beaumont Dr., Melville, N.Y. 11747

[21] Appl. No.: 775,508

[22] Filed: Sep. 12, 1985

[51] Int. Cl.$^4$ .............................................. H04B 9/00
[52] U.S. Cl. ..................................... 455/613; 307/262; 328/155; 358/143; 370/3; 455/618
[58] Field of Search ............... 455/613, 615, 618, 606, 455/607, 617, 43, 63; 358/143, 144, 145; 370/1, 3; 372/29, 32, 33, 38; 328/155; 307/262; 323/212, 213, 218

[56] References Cited

U.S. PATENT DOCUMENTS

| | | | |
|---|---|---|---|
| 3,875,400 | 4/1975 | Pao et al. | 455/619 |
| 4,009,385 | 2/1977 | Sell | 372/38 |
| 4,114,180 | 9/1978 | Kayanuma | 358/128 |

FOREIGN PATENT DOCUMENTS

| | | | |
|---|---|---|---|
| 57-83942 | 5/1982 | Japan | 455/611 |
| 58-222630 | 12/1983 | Japan | 455/618 |
| 59-36446 | 2/1984 | Japan | 455/613 |

OTHER PUBLICATIONS

Ueno–"Optical Fiber Communications"–Conf. Intercon 79, Expo Proceeding, Dallas, TX, Feb. 26–Mar. 2, 1979, pp. 172–176.
Dobson et al–"Installation and Performance"–Wire Technology, 7/8:79, vol. 7, No. 4, pp. 83–85.
Brosio et al–"Optical Receiver"–Cselt Rapporti Tecnici–vol. IX, No. 6, Dec. 1981, pp. 583–590.

*Primary Examiner*—Joseph A. Orsino, Jr.
*Attorney, Agent, or Firm*—Martin M. Novack

[57] ABSTRACT

A cross-talk suppression circuit is disclosed for use in an optical communications system which employs a light-emitting diode. A video signal and an audio-modulated carrier signal are both coupled to the light-emitting diode. A cross-talk reducing circuit is provided to couple the audio-modulated carrier signal to the light-emitting diode. The circuit comprises a voltage-controlled phase shifter for coupling the audio-modulated carrier signal to the light emitting diode, the phase shifter having a phase shift that is controlled by the video signal.

20 Claims, 1 Drawing Figure

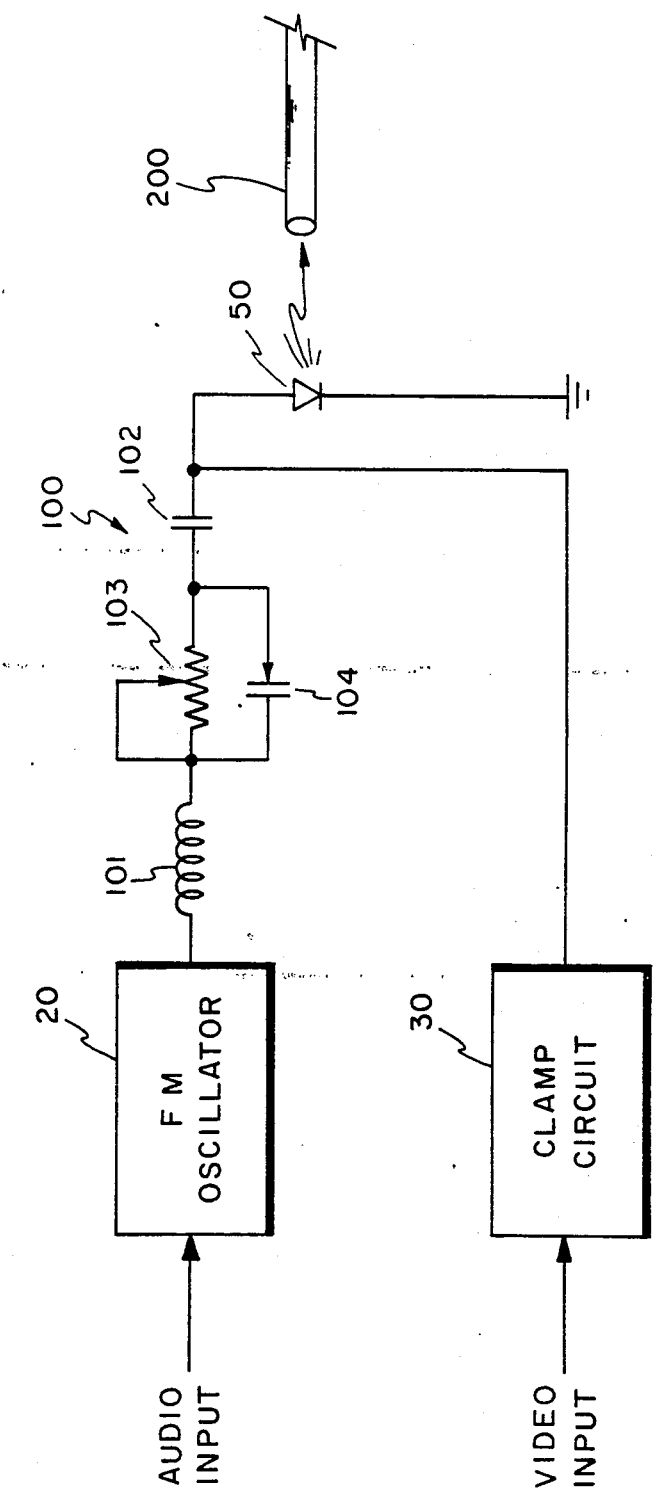

OPTICAL COMMUNICATION OF VIDEO AND AUDIO WITH CROSS-TALK SUPPRESSION

BACKGROUND OF THE INVENTION

This invention relates to improvements in communications systems and, more particularly, to a cross-talk suppression apparatus with application to an optical communication system in which audio and video information are combined and transmitted over an optical link.

In a common type of television communication over an optical communication system, such as one employing a fiber optical link, an amplitude-modulated television video signal is combined with an audio-modulated FM carrier signal, the combined signal being utilized to drive a light-emitting diode. The light emitted from the diode, which contains the video and audio information, is carried over the optical link and then recovered at a receiver.

A problem which occurs in the described type of communication results from cross-talk between the video and audio portions of the information. In particular, the audio sub-carrier is modulated to some degree by video leaking into the audio channel, and this results in an undesirable noise or "buzz" in the sound that is ultimately produced. This problem, which is also sometimes known as "cross-modulation" or "intermodulation", can also take the form of amplitude, phase or frequency modulation of the sound subcarrier.

It is an object of the present invention to reduce this problem which occurs in prior art systems.

BRIEF DESCRIPTION OF THE DRAWING

The drawing shows an embodiment of the invention, in schematic and partial block form, for optical communication of video and audio information with reduced cross-talk.

SUMMARY OF THE INVENTION

Present invention is directed to a cross-talk supression circuit for use in an optical communications system which employs a light-emitting diode. A video signal and an audio-modulated carrier signal are both coupled to the light-emitting diode. In accordance with the improvement of the invention, a cross-talk reducing circuit couples the audio-modulated carrier signal to the light-emitting diode, and serves to reduce cross-talk in the output of the light-emitting diode. The circuit comprises a voltage-controlled phase shifter for coupling the audio-modulated carrier signal to the light-emitting diode, the phase shifter having a phase shift that is controlled by the video signal.

In the preferred embodiment of the invention, the cross-talk reducing circuit includes an input terminal to which the audio-modulated carrier signal is applied, and a tuned circuit, including an inductor and a capacitor, coupled between the input terminal and the light-emitting diode. A variable-capacitance element is in series with the tuned circuit, and a resistive load is coupled in parallel with the variable-capacitance element. In this preferred embodiment, the variable-capacitance element has a capacitance which depends upon the voltage across the variable-capacitance element, and a variable-capacitance diode may be used. The resistive load is preferably an adjustable resistor which can be adjusted to minimize cross-talk in a given application.

Further features and advantages of the invention will become more readily apparent from the following detailed description when taken in conjunction with the accompanying drawing.

DESCRIPTION OF THE PREFERRED EMBODIMENTS

Before describing the preferred embodiment of the invention, some further analysis of the problem to be approached will be set forth. In the typical fiber optical communication system, the light-emitting diode is employed as a forward biased diode. The light-emitting diode has a characteristic "on" resistance and junction capacitance. The junction capacitance is typically around 400 picofarads. The "on" resistance is composed of a number of factors, an important one of which is the dynamic diode impedence which is inversely proportional to the instantaneous current flow through the diode. In the described application, the diode current will vary with video content. The dynamic resistance generally varies between about one-quarter ohm and one ohm. It will be understood, therefore, that the light-emitting diode can be thought of as a fixed shunt capacitance and a varying resistance, and this circuit model results in a phase shift of the audio signal (under undesired "control" of the video signal whose content is varying the resistance in this circuit model) which manifests itself as the problematic cross-talk.

In the present invention, a voltage-controlled phase shifter is utilized to operate on the audio-modulated carrier signal to introduce a phase shift that tends to cancel out the phase shift which is being caused by the change in dynamic diode impedance with video content. This is achieved by providing a circuit wherein the phase shift is controlled by the video signal.

Referring to the drawing, there is shown an embodiment of an improvement in accordance with the invention. An audio input is coupled to an FM oscillator 20, the output of which is coupled, via a voltage-controlled phase shifter circuit 100 in accordance with the invention, to a light-emitting diode 50. Light from the diode 50 is coupled to a fiber optics link, represented at 200. A video signal is coupled to a clamp circuit 30, the output of which is also applied to the light-emitting diode 50. If desired, a predistortion circuit may be employed in the video channel as described in my copending U.S. patent application Ser. No. 775,179, filed of even date herewith. Light from the diode 50 travels over optical link 200 to a receiver (not shown) where the audio and video information are recovered. Other portions of the optical communications system, which are known in the art and not the subject of the improvements of the invention, per se, are not shown.

The circuit 100 in accordance with the present embodiment of the invention couples the audio-modulated carrier from oscillator 20 to the light-emitting diode 50, and introduces a phase shift that is dependent upon the video signal. An inductor 101 and a capacitor 102 comprise a tuned circuit, and a variable-capacitance diode 104 is in series with the tuned circuit. This diode also contributes capacitance, the size of said capacitance depending upon the diode voltage. A variable resistance 103 is in parallel with the diode 104, and provides an adjustable load across the variable-capacitance diode 104. This resistance can be adjusted appropriately with, for example, a lower resistance causing a lower voltage drop across the diode 104 which would increase the capacitance of the diode 104. The variable-capacitance diode may be, for example, a "Varicap" diode, or an ordinary rectifier diode such as an 1N4002, which also exhibits a variable capacitance with applied voltage. The diode is self-biased by virtue of its internally rectifying the applied FM subcarrier. In the illustrated embodiment, the capacitor 102 serves as a DC blocking capacitor and also as a part of the tuned circuit. The inductor 101 is a resonator for circuit capacitance to form a tuned circuit which preferably resonates near, but not at, the subcarrier frequency. The illustrated polarity of diode 104 is appropriate for being affected by the video signal, so as to change the phase shift of the circuit 100 in a manner opposite to that caused by the change in dynamic impedance of the light-emitting diode with the video signal. If the polarity of the modulation of the video signal is reversed, the polarity of diode 104 would, of course, also be reversed.

The invention has been described with reference to a particular embodiment, the variations within the spirit and scope of the invention will occur to those skilled in the art. For example, in the preferred embodiment the circuit set forth in the voltage-controlled phase shifter is a bandpass-type circuit, and it will be understood that a voltage-controlled phase shifter which operates low-pass, high-pass, or all-pass could also be employed.

I claim:

1. In an optical communications system wherein a video signal and an audio-modulated carrier signal are both coupled to a light-emitting diode, the improvement comprising: a circuit coupling said audio-modulated carrier signal to said light-emitting diode for reducing cross-talk in the output of said light-emitting diode, said circuit comprising a phase shifter for coupling said audio-modulated carrier signal to said light emitting diode, said phase shifter having a phase shift that is controlled by said video signal.

2. The circuit as defined by claim 1, wherein said phase-shifter is a voltage-controlled phase shifter.

3. In an optical communications system wherein a video signal and an audio-modulated carrier signal are both coupled to a light-emitting diode, a circuit coupling said audio-modulated carrier signal to said light-emitting diode for reducing cross-talk in the output of said light-emitting diode, comprising:
 an input terminal to which said audio-modulated carrier signal is applied;
 a tuned circuit, including an inductor and a capacitor, coupled between said input terminal and said light-emitting diode;
 a variable-capacitance element in series with said tuned circuit; and
 a resistive load coupled in parallel with said variable-capacitance element.

4. The circuit as defined by claim 3, wherein said variable-capacitance element has a capacitance which depends upon the voltage across said variable-capacitance element.

5. The circuit as defined by claim 4, wherein said variable-capacitance element is a variable-capacitance diode.

6. The circuit as defined by claim 3, wherein said resistive load comprises an adjustable resistor.

7. The circuit as defined by claim 5, wherein said resistive load comprises an adjustable resistor.

8. The circuit as defined by claim 5, wherein said resistive load comprises an adjustable resistor.

9. The circuit as defined by claim 3, wherein said tuned circuit comprises said inductor and capacitor coupled in a series arrangement.

10. The circuit as defined by claim 4, wherein said tuned circuit comprises said inductor and capacitor coupled in a series arrangement.

11. The circuit as defined by claim 8, wherein said tuned circuit comprises said inductor and capacitor coupled in a series arrangement.

12. In an optical communication system for carrying signals representative of a video signal and an audio-modulated carrier signal over an optical carrier, a transmitter comprising:
 a source of video signal;
 a source of audio-modulated carrier signal;
 a light-emitting diode for generating light representative of information in said video signal and said audio-modulated carrier signal;
 said source of video signal being coupled to said light-emitting diode;
 said source of audio-modulated carrier signal being coupled to said light-emitting diode via a cross-talk suppression circuit which comprises:
  an input terminal coupled to said source of audio-modulated carrier signal;
  an output terminal coupled to said light-emitting diode;
  a tuned circuit, including an inductor and a capacitor, coupled between said input and output terminals;
  a variable-capacitance element also coupled between said input and output terminals, in series with said tuned circuit; and
  a resistive load coupled in parallel with said variable-capacitance element.

13. The system as defined by claim 12, wherein said variable-capacitance element has a capacitance which depends upon the voltage across said variable-capacitance element.

14. The system as defined by claim 13, wherein said variable-capacitance element is a variable-capacitance diode.

15. The system as defined by claim 12, wherein said resistive load comprises an adjustable resistor.

16. The system as defined by claim 13, wherein said resistive load comprises an adjustable resistor.

17. The system as defined by claim 14, wherein said resistive load comprises an adjustable resistor.

18. The system as defined by claim 12, wherein said tuned circuit comprises said inductor and capacitor coupled in a series arrangement.

19. The system as defined by claim 14, wherein said tuned circuit comprises said inductor and capacitor coupled in a series arrangement.

20. The system as defined by claim 17, wherein said tuned circuit comprises said inductor and capacitor coupled in a series arrangement.

* * * * *